Oct. 30, 1945.  R. A. BRADLEY  2,387,874
LOAD BEARING SPRING ASSEMBLY FOR TRUCKS OR THE LIKE
Filed April 15, 1943  2 Sheets-Sheet 1
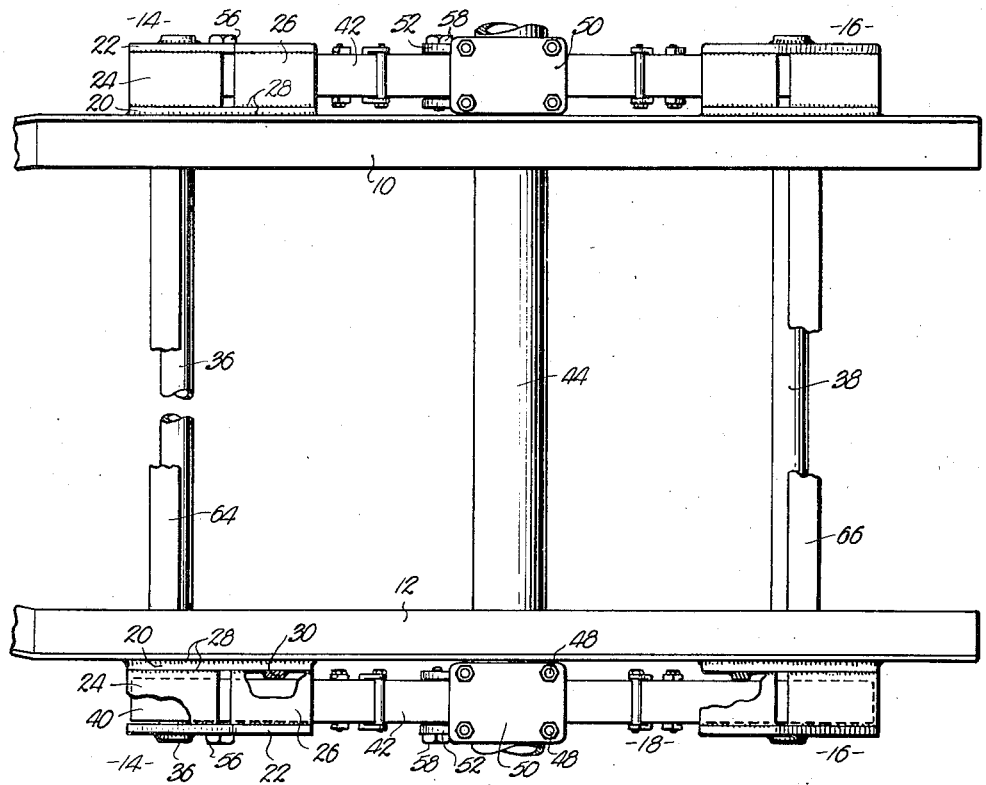
Fig. 1.
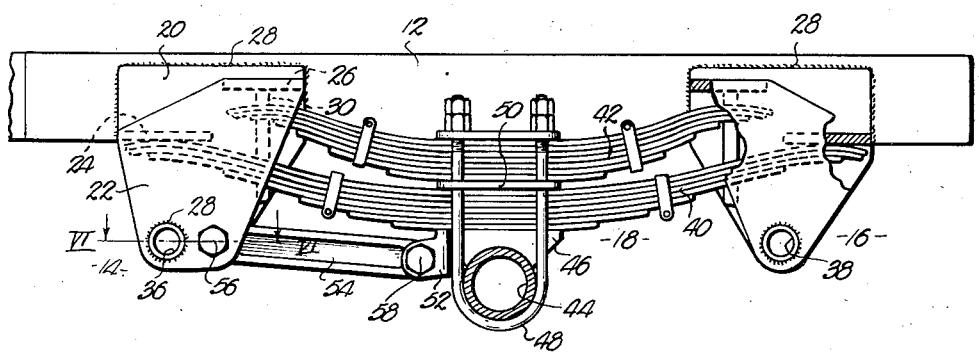
Fig. 2.
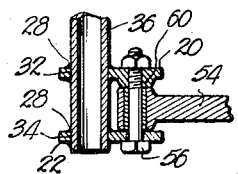
Fig. 6.
INVENTOR.
Ralph A. Bradley
BY
ATTORNEY.

Oct. 30, 1945.  R. A. BRADLEY  2,387,874
LOAD BEARING SPRING ASSEMBLY FOR TRUCKS OR THE LIKE
Filed April 15, 1943  2 Sheets-Sheet 2

INVENTOR.
Ralph A. Bradley
BY
ATTORNEY.

Patented Oct. 30, 1945

2,387,874

UNITED STATES PATENT OFFICE 2,387,874

LOAD BEARING SPRING ASSEMBLY FOR TRUCKS OR THE LIKE

Ralph A. Bradley, Minneapolis, Minn., assignor to Bradley Equipment Company, St. Paul, Minn., a corporation of Minnesota Application April 15, 1943, Serial No. 483,151

7 Claims. (Cl. 267—36)

This invention relates to a load bearing spring assembly and more particularly to structure of that character adapted for use on heavy duty trucks and trailers.

In providing springs for vehicles such as trucks and transport trailer tanks, efforts have been made to compensate for the differential in weight of empty tanks as compared to the same tanks when loaded. The procedure commonly followed is to employ spring assemblies with heavy lower or main springs and lighter top or overload springs, the latter serving to assist the main springs under heavy loads but carrying no weight when the tank is empty. As a result the empty tank is carried on very strong springs which transmit practically all of the road vibrations directly to the tank, thereby materially shortening its life. Moreover, breakage of springs is relatively common in assemblies of this character since excessive strains are placed on the lower spring.

The principal object of this invention is the provision of a spring assembly for a trailer tank or the like, wherein a long, relatively flexible spring is employed for carrying the entire load when the tank is empty, and in which a short, heavy spring of low deflection ratio is used for supporting the major portion of the load when the tank is filled.

Another important aim of this invention is the provision of a spring assembly constructed to withstand extremely violent side thrusts, thereby obviating misalignment of the vehicle wheels and resultant excess wear on tires.

It is a further object of the invention to provide spring brackets of a type that can be readily built up of a plurality of heavy metal plates in a manner to produce a much stronger bracket than a cast iron support of corresponding weight.

Other objects will appear during the course of the following specification, referring to the accompanying drawings, wherein:

Fig. 1 is a plan view of a spring assembly constructed in accordance with this invention and mounted on a vehicle frame, the latter being shown fragmentarily.

Fig. 2 is a side elevational view of the parts shown in Fig. 1.

Fig. 6 is a fragmentary sectional view taken on line VI—VI of Fig. 2.

Figures 3, 4, 5:
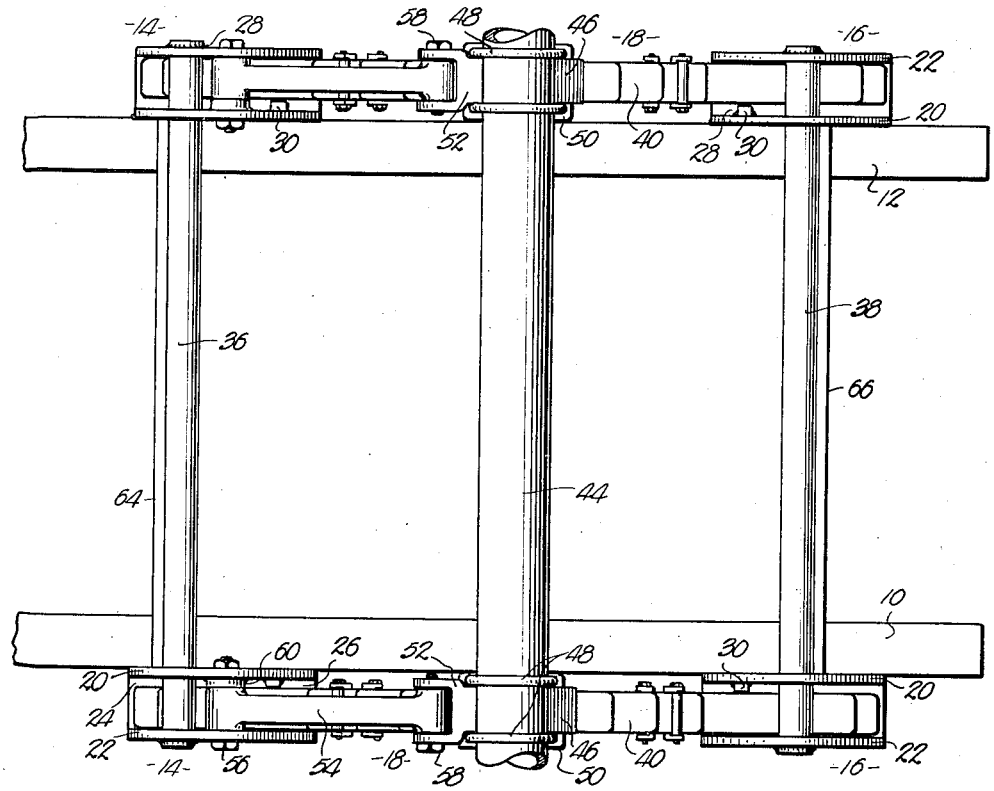
Fig. 3 is an inverted plan view of a pair of frame members with the spring assembly mounted thereon.
Fig. 4 is a front end elevational view of the spring assembly, the frame members being shown in cross section.
Fig. 5 is a fragmentary cross sectional view taken on line V—V of Fig. 4.

In the drawings the numerals 10 and 12 designate a pair of spaced frame members which may comprise the sub-frame or sills of a truck, trailer or similar vehicle.

Front and rear spring brackets 14 and 16 respectively, for seating a spring unit 18, are similar in construction, and a pair of each are provided for both sills 10 and 12.

The front spring bracket 14 is built up of an inner plate 20, an outer plate 22, and cross plates 24 and 26. These plates are formed of relatively heavy metal stock and are securely welded together as indicated at 28. Cross plates 24 and 26 are horizontally arranged in offset relation to each other, plate 24 being located in the front half of the bracket at its approximate center, and plate 26 in the rear half and at the upper edge of the bracket. A vertically positioned guide bar 30 intermediate the side edges of cross bar 26, is welded to the inner face of inner plate 20.

Openings 32 and 34 in plates 20 and 22 respectively, are in horizontal alignment and provided to receive a front tubular tie member 36 which is welded in place in each of the plates of both front spring brackets 14 to produce a very rigid bracket assembly for the spring units 18.

Rear spring brackets 16 are substantially identical in construction to the front brackets, above described, and a rear tie member 38 is fitted into these brackets in exactly the same manner as member 36.

Each of spring units 18 comprises a main spring 40 and an overload spring 42, having their ends inserted between the inner and outer plates of front and rear spring brackets 14 and 16, the ends of the main spring engaging the lower face of cross plates 24 and the ends of the overload spring striking the cross plates 26 when the load carried on the vehicle is sufficiently heavy to straighten out the spring units to that extent.

Both main and overload springs 40 and 42 preferably have an equal number of leaves, all of uniform thickness. In springs proportioned as shown in Fig. 2 of the drawings, the main spring will deflect approximately three times as far as the shorter overload spring, but will carry only one-third as much weight. Accordingly, the tank when empty, is supported by the long, flexible spring 40, which effectively absorbs the road shocks and protects the tank against excessive vibrations. When the unit is loaded however, the ends of spring 42 are engaged by cross plates 26 and most of the weight is carried by the shorter spring while the longer spring 40 serves merely to assist in supporting the load.

The main and overload springs 40 and 42 respectively are mounted on an axle 44 by means of the usual saddle 46, U-bolt clamps 48, and plates 50.

Saddle 46 is provided with a pair of spaced apart ears 52 for receiving therebetween one end of a radius rod 54, having its opposite end positioned between the inner and outer plates of front spring bracket 14. A cross bolt 56 extended through one end of the rod 54 and through plates 20 and 22, and a cross bolt 58 passed through spaced ears 52 and the other end of the rod serve to hold the spring bracket 14, the spring unit 18 and radius rod 54 in connected condition. As will be observed from Figs. 3 and 6, the inner plate 20 is provided with a boss 60 which, together with guide bar 30, hold radius rod 54 and spring unit 18 away from their respective frame member 10 or 12 as the case may be, to afford sufficient clearance for free passage of plates 50 along the side of the frame member.

In order to further strengthen the spring assembly, a filler plate 62, having an upper lateral flange 64, is securely welded to front tie member 36, along the upper center line thereof, to the lower faces of frame members 10 and 12, and at its opposite ends to inner plates 20 of the spring brackets. Similarly, a filler plate 66 is mounted between rear brackets 16. Thus, the filler plates 62 and 66, and the tie members 36 and 38, extended through both inner and outer plates of the spring brackets, cooperate to produce an exceedingly strong and rigid spring assembly.

The objects of this invention have, therefore been accomplished in a simple and effective manner, and since it is possible that various modifications might be made without departing from the spirit of the invention, it is desired to be limited only by the scope of the appended claims.

Having thus described the invention, what is claimed as new and desired to be secured by Letters Patent is:

1. In a spring assembly for a vehicle having a pair of spaced frame members and an axle, a front pair and a rear pair of spring brackets fixed to said frame members, each of said brackets comprising two spaced apart plates; front and rear tie members for respectively connecting the front and rear pairs of brackets; a filler plate for each pair of brackets having its ends secured to the brackets, one of its longitudinal edges secured to the respective tie-member and its other longitudinal edge secured to the frame members; and spring units mounted on the axle and having their opposite ends in engagement with the front and rear brackets; said tie members extending through the respective brackets to bridge the space between said plates thereof.

2. In a spring assembly for a vehicle having a pair of spaced frame members and an axle, a front pair and a rear pair of spring brackets fixed to said frame members, each bracket comprising an inner and an outer plate in horizontally aligned relation, and upper and lower cross plates in vertically offset relation to each other joining said inner and outer plates; and spring units mounted on the axle, each unit comprising a main and an overload spring having their ends respectively adapted to engage the lower and upper cross plates of a front and rear bracket.

3. In a spring assembly for a vehicle having a pair of spaced frame members and an axle, a front pair and a rear pair of spring brackets fixed to said frame members; front and rear tie members for respectively connecting the front and rear pairs of brackets; a filler plate for each pair of brackets having its ends secured to the brackets, one of its longitudinal edges secured to the respective tie-member and its other longitudinal edge secured to the frame members; spring units mounted on the axle and having their opposite ends in engagement with the front and rear brackets; and radius rods operably connecting said spring units with the front brackets; said tie members being tubular and extending transversely through the brackets which they connect.

4. In a spring assembly for a vehicle having a pair of spaced frame members and an axle, a front pair and a rear pair of spring brackets fixed to said frame members, each bracket comprising an inner and an outer plate in spaced apart relation, and upper and lower cross plates in vertically offset relation to each other joining said inner and outer plates; spring units mounted on the axle, each unit comprising a long main spring and a shorter overload spring having their ends respectively adapted to engage the lower and upper cross plates of a front and rear bracket; and radius rods operably connecting said spring units with the front brackets.

5. In a spring assembly for a vehicle having a pair of spaced frame members and an axle, a front pair and a rear pair of spring brackets fixed to said frame members, each bracket comprising an inner and an outer plate in spaced apart relation, and upper and lower cross plates in vertically offset relation to each other joining said inner and outer plates; front and rear tie members extended through the front and rear pairs of brackets respectively for holding said brackets in fixed spaced relation; and spring units mounted on the axle, each unit comprising a long lower spring and a shorter upper spring having their ends respectively adapted to engage the lower and upper cross plates of the front and rear pairs of brackets.

6. In a spring assembly for a vehicle having a pair of spaced frame members and an axle, a front pair and a rear pair of brackets fixed to said frame members, each bracket comprising an inner and an outer plate in spaced apart relation, and vertically offset upper and lower cross plates joining said inner and outer plate; and spring units mounted on the axle, each unit comprising a long lower spring and a shorter upper spring having their ends respectively adapted to engage the lower and upper cross plates of a front and rear bracket, each of said lower and upper springs having an equal number of leaves.

7. In a spring assembly for a vehicle having a pair of spaced frame members and an axle, a front pair and a rear pair of brackets fixed to said frame members, each bracket comprising an inner and an outer plate in spaced apart relation, and vertically offset upper and lower cross plates joining said inner and said outer plate; spring units mounted on the axle, each unit comprising a long lower spring and a shorter upper spring having their ends respectively adapted to engage the lower and upper cross plates of a front and rear bracket, each of said lower and upper springs having an equal number of leaves of the same thickness; and radius rods operably connecting said spring units with the front brackets.

RALPH A. BRADLEY.